United States Patent
Ryu

(10) Patent No.: US 12,282,440 B2
(45) Date of Patent: Apr. 22, 2025

(54) INTEGRATED CIRCUIT AND SYSTEM CONTROL DEVICE INCLUDING SAME

(71) Applicant: FINDEACHIP Inc., Cheongju-si (KR)

(72) Inventor: Dong Yeol Ryu, Cheongju-si (KR)

(73) Assignee: FINDEACHIP Inc., Cheongju-si (KR)

( * ) Notice: Subject to any disclaimer, the term of this patent is extended or adjusted under 35 U.S.C. 154(b) by 96 days.

(21) Appl. No.: 17/727,812

(22) Filed: Apr. 25, 2022

(65) Prior Publication Data

US 2022/0245077 A1 Aug. 4, 2022

Related U.S. Application Data

(63) Continuation of application No. PCT/KR2020/007624, filed on Jun. 12, 2020.

(51) Int. Cl.
*G06F 13/38* (2006.01)

(52) U.S. Cl.
CPC .......... *G06F 13/38* (2013.01); *G06F 2213/40* (2013.01)

(58) Field of Classification Search
CPC .... G06F 13/38; G06F 13/385; G06F 13/4282; G06F 13/4291
See application file for complete search history.

(56) References Cited

U.S. PATENT DOCUMENTS

| | | | |
|---|---|---|---|
| 6,034,955 A | 3/2000 | Cho | |
| 7,342,984 B1* | 3/2008 | Yearsley | H04L 25/0262 375/225 |
| 2007/0208470 A1 | 9/2007 | Tabashi et al. | |
| 2010/0318238 A1* | 12/2010 | Bryson | G06F 1/26 380/255 |
| 2014/0310436 A1* | 10/2014 | Du | G06F 13/362 710/110 |
| 2015/0074306 A1* | 3/2015 | Ayyagari | G06F 13/4072 710/110 |
| 2016/0294544 A1* | 10/2016 | Jang | H04B 1/16 |
| 2021/0402784 A1* | 12/2021 | Panshin | B41J 2/17526 |
| 2023/0215313 A1* | 7/2023 | Ryu | G06F 13/4282 345/184 |
| 2023/0229617 A1* | 7/2023 | Ryu | G06F 13/4068 710/106 |

FOREIGN PATENT DOCUMENTS

| | | |
|---|---|---|
| KR | 10-1998-0028827 A | 7/1998 |
| KR | 10-1999-0074276 A | 10/1999 |
| KR | 10-1999-0074894 A | 10/1999 |
| KR | 10-2003-0046927 A | 6/2003 |
| KR | 10-1634155 B1 | 6/2016 |

OTHER PUBLICATIONS

International Search Report for PCT/KR2020/007624 mailed Mar. 3, 2021 from Korean Intellectual Property Office.

* cited by examiner

*Primary Examiner* — Brian T Misiura
(74) *Attorney, Agent, or Firm* — Revolution IP, PLLC

(57) ABSTRACT

A system control apparatus according to some embodiments of the present disclosure includes a plurality of ICs and an interface for transmitting, through a single data line, data signals in the plurality of ICs, wherein the data signal includes: a first signal indicating a target IC from among the plurality of ICs; and a third signal indicating data to be provided to the target IC. According to this configuration, both data input and output can be performed through the single data line and data communication between a plurality of different ICs can be performed through the single data line.

6 Claims, 10 Drawing Sheets

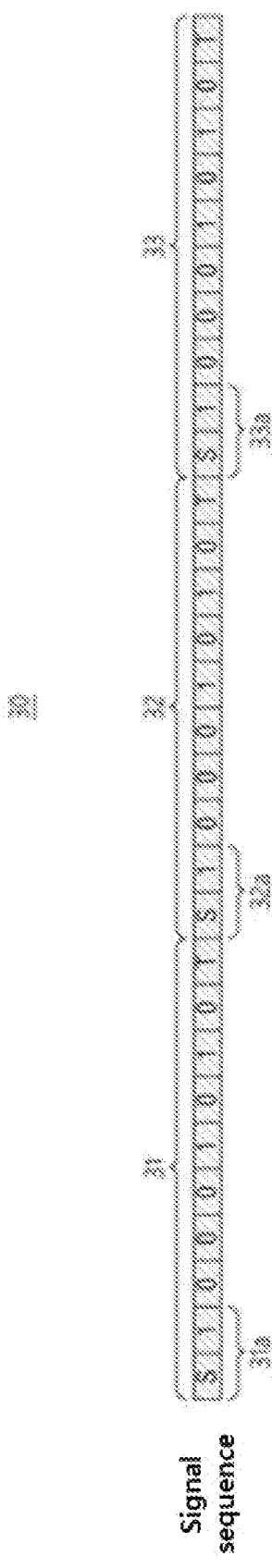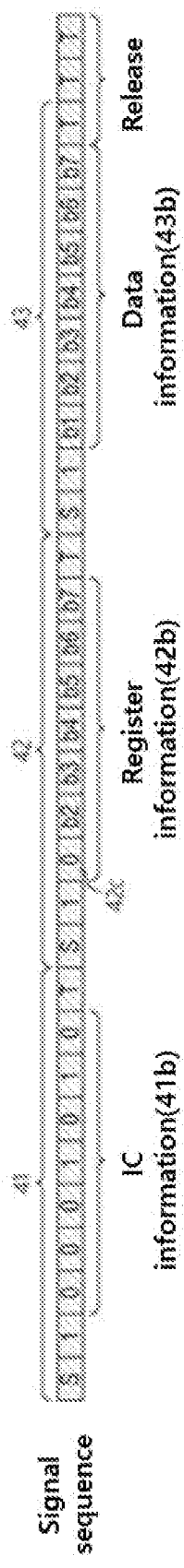

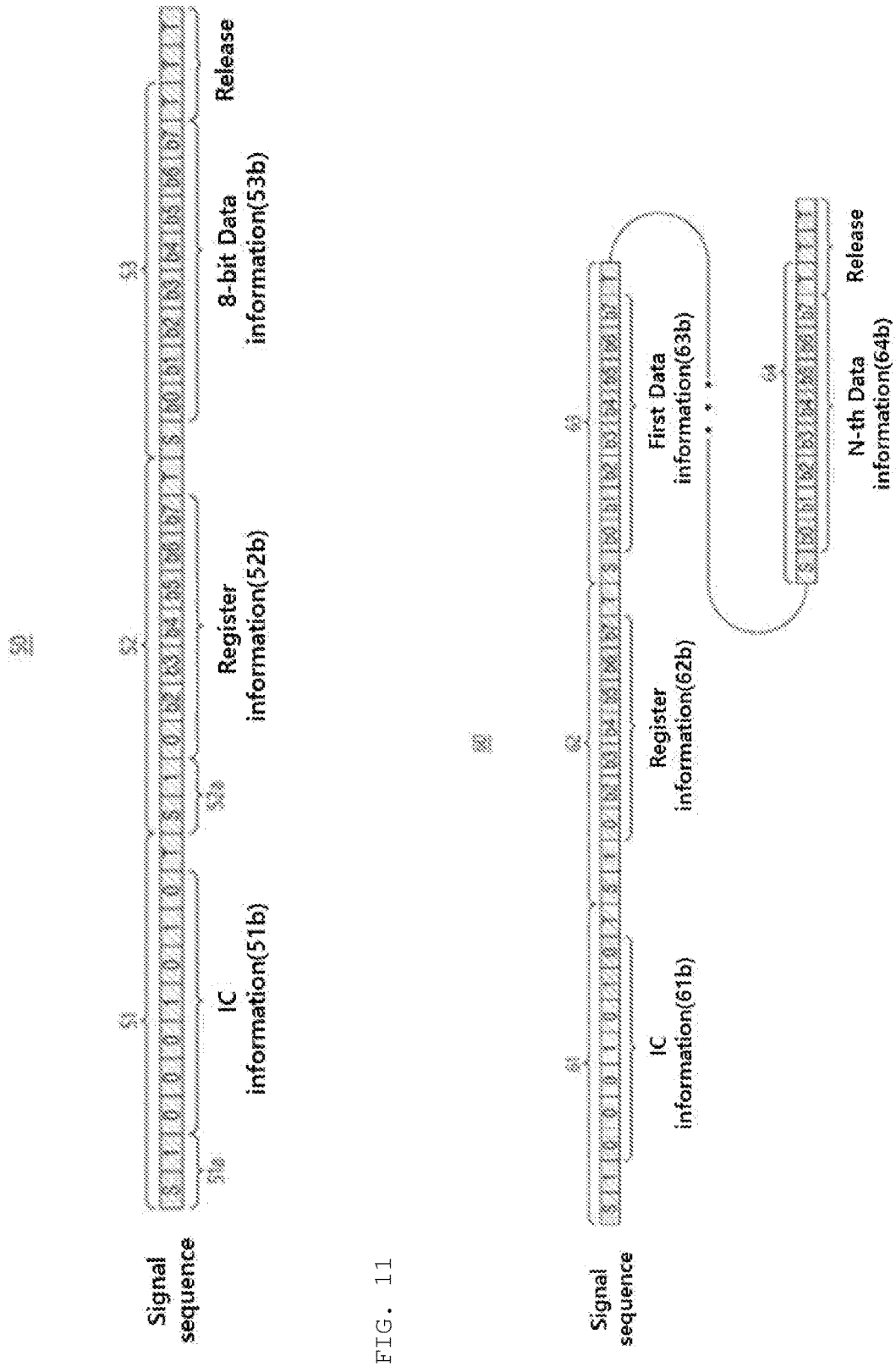

INTEGRATED CIRCUIT AND SYSTEM CONTROL DEVICE INCLUDING SAME

CROSS REFERENCE TO PRIOR APPLICATION

This application is a continuation application of PCT International Patent Application No. PCT/KR2020/007624 filed on Jun. 12, 2020, which claims priority to Korean Patent Application No. 10-2019-0135499 filed on Oct. 29, 2019, which are all hereby incorporated by reference in their entirety.

TECHNICAL FIELD

The present disclosure relates to an integrated circuit and a system control device including the same. More particularly, the present disclosure relates to an integrated circuit for transmitting or receiving data through a single line interface, and a system control device including the same.

BACKGROUND ART

Various sensors and switches are used in home appliances such as refrigerators, washing machines, air conditioners and the like. For example, in the case of a refrigerator, various switches for driving LEDs and opening and closing dampers are required together with a temperature sensor and a humidity sensor for controlling temperature and humidity inside the refrigerator.

These various sensors and switches are controlled through integrated circuits designed for their own functions.

An integrated circuit refers to a functional device having a complete circuit function, which is manufactured in a structure integrating a plurality of active devices and passive devices that cannot be separated from each other on a single semiconductor substrate in an ultra-small size. Integrated circuits generally exchange signals or data with other integrated circuits in the process of operation. As such, a module that performs input/output of signals or data with external integrated circuits is referred to as an interface or an input/output interface.

In the input/output interface of a conventional general integrated circuit, a data terminal for input and a data terminal for output are provided separately. Therefore, at least two data lines are required to interface with other integrated circuits, and this increases complexity of the overall control circuit and makes circuit design difficult in connection with increase in the number of interfacing integrated circuits as the home appliances are advanced.

Prior Art Document (Patent Document 0001) Korean Patent Registration No. 10-1634155 (published on Jun. 22, 2016)

DISCLOSURE OF INVENTION

Technical Problem

A technical problem to be solved through some embodiments of the present disclosure is to provide an integrated circuit, which can perform both data input and output functions through a single data line, and a system control device including the same.

Another technical problem to be solved through some embodiments of the present disclosure is to provide an integrated circuit, which can perform data communication between a plurality of other integrated circuits through a single data line, and a system control device including the same.

Still another technical problem to be solved through some embodiments of the present disclosure is to provide an integrated circuit, which can variably adjust the speed of data communication between integrated circuits, and a system control device including the same.

Still another technical problem to be solved through some embodiments of the present disclosure is to provide an integrated circuit, which can prevent spread of sampling error even when the length of data communication increases, and a system control device including the same.

Technical problems of the present disclosure are not limited to the technical problems mentioned above, and unmentioned other technical problems will be clearly understood by those skilled in the art from the following description.

Technical Solution

To accomplish the above objects, according to some embodiments of the present disclosure, there is provided a system control device comprising: a plurality of ICs; and an interface for transferring data signals between the plurality of ICs through a single data line, wherein the data signal includes: a first signal indicating a target IC among the plurality of ICs; and a third signal indicating a target data to be provided to the target IC.

As an embodiment, the data signal may further include a second signal indicating a target register, to which the target data is provided, among registers of the target IC.

As an embodiment, the first signal may include address information of the target IC, wherein an IC corresponding to the address information among the plurality of ICs may process the target data in response to the third signal, and an IC that does not correspond to the address information among the plurality of ICs may not process the target data despite the third signal.

As an embodiment, the first signal may include: a start bit indicating a start of the first signal; a stop bit indicating an end of the first signal; and an information area located between the start bit and the stop bit, wherein some bits of the information area may be used to indicate a transmission speed of the data signal.

As an embodiment, some bits may include a bit adjacent to the start bit in the information area, and the transmission speed of the data signal may be expressed by a pulse width time between the start bit and the adjacent bit.

As an embodiment, when the data signal is received, the plurality of ICs may determine a sampling time point for sampling bits of the data signal on the basis of the transmission speed of the data signal indicated by some bits of the information area.

As an embodiment, when the bits of the data signal are sampled, the plurality of ICs may determine the sampling time point so that the sampling may be performed at a center of each pulse.

As an embodiment, the third signal may include a stop bit indicating an end of the third signal, and data communication for transfer of the data signal may be released in response to that the stop bit and two consecutive idle bits adjacent to the stop bit indicate the same signal.

According to another aspect of the present disclosure, there is provided a system control device comprising: a plurality of ICs; and an interface for transferring data signals between the plurality of ICs through a single data line, wherein the data signal includes a plurality of signals distinguished from each other, the plurality of signals includes an area indicating a transmission speed of the data signal, the transmission speed of the data signal is indicated by a pulse width time between a start bit of a signal, including the area indicating the transmission speed of the data signal among the plurality of signals, and a bit adjacent to the start bit.

As an embodiment, the plurality of signals may repeatedly include an area indicating the transmission speed of the data signal.

As an embodiment, the plurality of signals may include: a first signal indicating a target IC among the plurality of ICs; a second signal indicating a target register of the target IC; and a third signal indicating a target data to be provided to the target register of the target IC.

As an embodiment, the first signal and the second signal may include an area indicating the transmission speed of the data signal, and the third signal may not include an area indicating the transmission speed of the data signal.

According to another aspect of the present disclosure, there is provided an integrated circuit comprising: a control unit; and an interface unit for receiving data from the control unit or providing data to the control unit, wherein the interface unit is configured to simultaneously transfer a data signal to a plurality of ICs through a single data line, and the data signal includes: a first signal indicating a target IC among the plurality of ICs; and a third signal indicating a target data to be provided to the target IC.

As an embodiment, the interface unit may receive different data signals from the plurality of ICs through the single data line, and the control unit may determine whether or not to perform receiving or processing data included in the different data signals on the basis of address information included in the different data signal.

Advantageous Effects

According to the technical configuration of some embodiments of the present disclosure, input and output of data between integrated circuits may be performed through a single data line.

In addition, since an integrated circuit may perform data communication with a plurality of integrated circuits through only a single data line without having to be provided with a separate data line for each integrated circuit even when interfacing with the plurality of integrated circuits, the overall complexity of circuits can be lowered, and difficulty of circuit design may also be lowered.

In addition, since the speed of data communication between integrated circuits can be variably adjusted, data communication can be performed at an optimal transmission speed according to surrounding situations.

In addition, since the sampling time point is periodically refreshed in the process of data communication, spread of sampling error can be prevented even when the length of data communication between integrated circuits increases.

BRIEF DESCRIPTION OF THE DRAWINGS

FIGS. 8 to 11 are views showing a method of repeatedly including an area indicating transmission speed of a data signal in order to prevent spread of sampling error in data communication through a single line interface according to some embodiments of the present disclosure.

BEST MODE FOR CARRYING OUT THE DISCLOSURE

Figure 1:
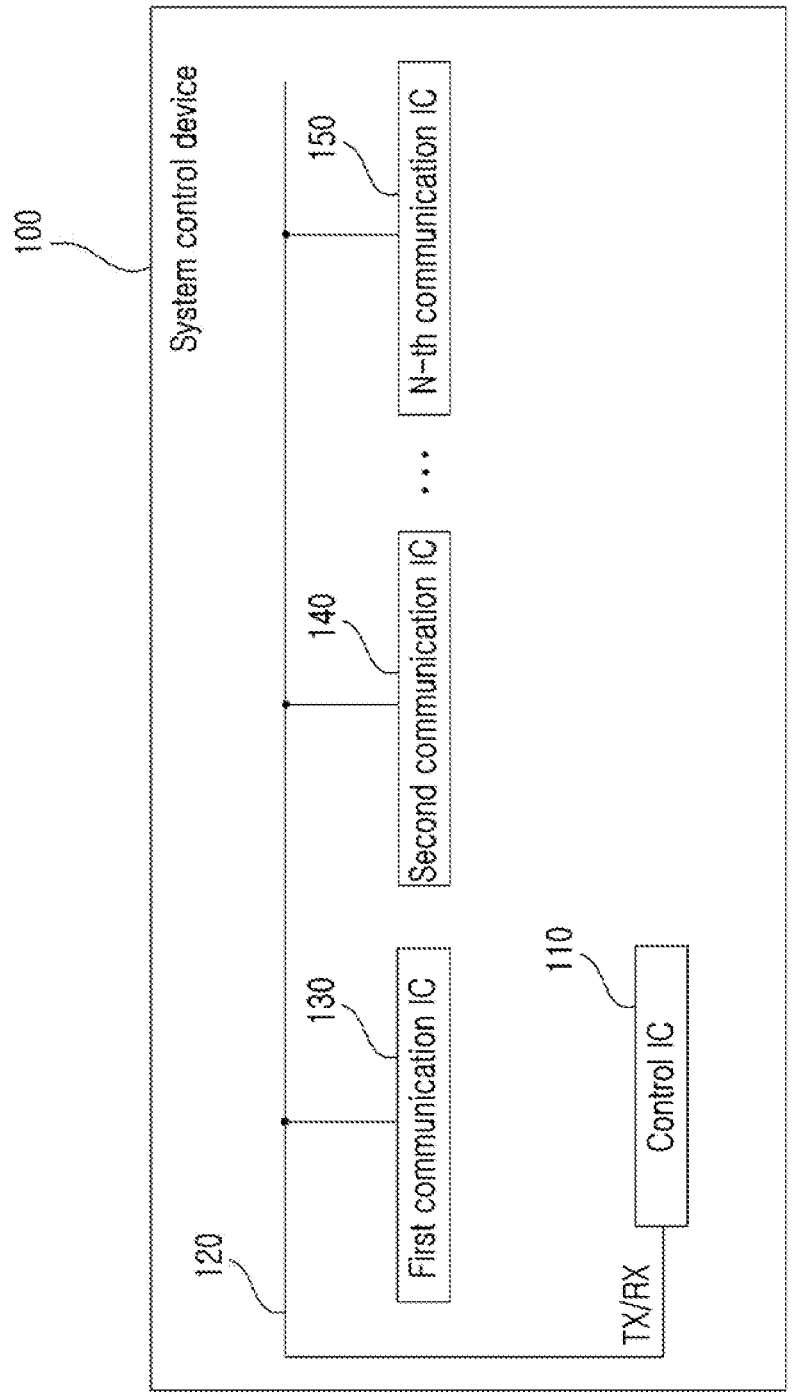
FIG. 1 is a schematic view showing a system control device for performing data communication through a single line interface according to some embodiments of the present disclosure.

Hereinafter, preferred embodiments of the present disclosure will be described in detail with reference to the accompanying drawings. Advantages and features of the present disclosure, and a method for achieving them will become apparent with reference to the embodiments described below in detail, together with the accompanying drawings.

However, the technical spirit of the present disclosure is not limited to the embodiments described below, and may be implemented in various different forms. The embodiments described below are provided only to make the technical spirit of the present disclosure complete and to fully inform the scope of the present disclosure to those skilled in the art, and the technical spirit of the present disclosure is only defined by the scope of the claims.

In adding reference numerals to the components of each drawing, it should be noted that the same components are given the same reference numerals as much as possible even though they are shown in different drawings. In addition, in describing the present disclosure, when it is determined that the detailed description of related known configurations or functions may unnecessarily blur the gist of the present disclosure, the detailed description will be omitted.

Unless otherwise defined, all terms (including technical and scientific terms) used in this specification may be used as a meaning commonly understood by those skilled in the art. In addition, the terms defined in a generally used dictionary are not to be ideally or excessively interpreted unless clearly defined in particular. The terms used in this specification are for describing the embodiments and are not intended to limit the present disclosure. In this specification, singular forms also include plural forms unless specially stated otherwise in the phrases.

In addition, in describing the components of the present disclosure, terms such as first, second, A, B, (a), (b), and the like may be used. These terms are only for distinguishing the components from other components, and the nature, sequence, or order of the components are not limited by the terms. When it is described that a component is "linked", "coupled" or "connected" to another component, although the component may be directly linked or connected to another component, it should be understood that still another component may also be "linked", "coupled" or "connected" between the components.

The terms "comprises" and/or "comprising" used in the present disclosure mean that a mentioned component, step, operation, and/or element does not exclude presence or addition of one or more other components, steps, operations, and/or elements.

Hereinafter, various embodiments of the present disclosure for solving the technical problems described above will be described.

FIG. 1 is a schematic view showing a system control device for performing data communication through a single line interface according to some embodiments of the present disclosure.

Referring to FIG. 1, a system control device 100 performs data communication between a plurality of ICs 110, 130, 140, and 150 through a single line interface. In FIG. 1, the plurality of ICs 110, 130, 140, and 150 is commonly connected to a single data line 120, and may perform both input and output of data between the ICs 110, 130, 140, and 150 using only the single data line 120 through a single line interface.

In the present disclosure, the single line interface is an interface that performs data communication with other ICs through the single data line 120, and may be a concept referring to an input/output interface that is independently or collectively provided in each of the plurality of ICs 110, 130, 140, and 150.

Since a detailed configuration of the single line interface is described below with reference to FIGS. 12 and 13, detailed description thereof will be omitted here.

As an embodiment, the plurality of ICs 110, 130, 140, and 150 may be divided into a control IC 110 and a plurality of communication ICs 130, 140, and 150 controlled by the control IC 110.

At this point, the control IC 110 may be a master IC, and the plurality of communication ICs 130, 140, and 150 may be slave ICs.

For detailed description of the present embodiment, a case in which the control IC 110 transmits a data signal to other ICs 130, 140, and 150 is exemplified. When the control IC 110 desires to transmit a data signal to a first communication IC 130, the control IC 110 outputs the data signal desired to be transmitted to the single data line 120.

At this point, the data signal includes information indicating a target IC, which is a destination to which the control IC 110 desires to transfer the data signal.

Since the data line 120 is also connected to other ICs 140 and 150, in addition to the first communication IC 130, the output data signal is transmitted to the first communication IC 130 and the other ICs 140 and 150 at the same time. The first communication IC 130 and the other ICs 140 and 150 receive the transferred data signal and identify information indicating a target IC included in the data signal. Accordingly, when an IC determines that the IC itself corresponds to the target IC, the IC performs an operation instructed by a command or data included in the data signal.

Contrarily, when it is determined that the IC itself does not correspond to the target IC, the IC ignores the received data signal and does not perform a particular operation.

Meanwhile, although a case in which the control IC 110 outputs a data signal is exemplified herein, the scope of the present disclosure is not limited thereto.

For example, an embodiment in which any one among the plurality of communication ICs 130, 140, and 150 outputs a data signal and the control IC 110 functions as a target IC at that time is also possible. This can be simply implemented by including information designating the control IC 110 as the target IC in the data signal.

According to the configuration as described above, it is possible to selectively perform data communication with a plurality of other ICs 130, 140, and 150 using only a single data line 120.

In addition, there is an advantage in that both input and output of data can be performed through a single data line 120.

Figure 2:
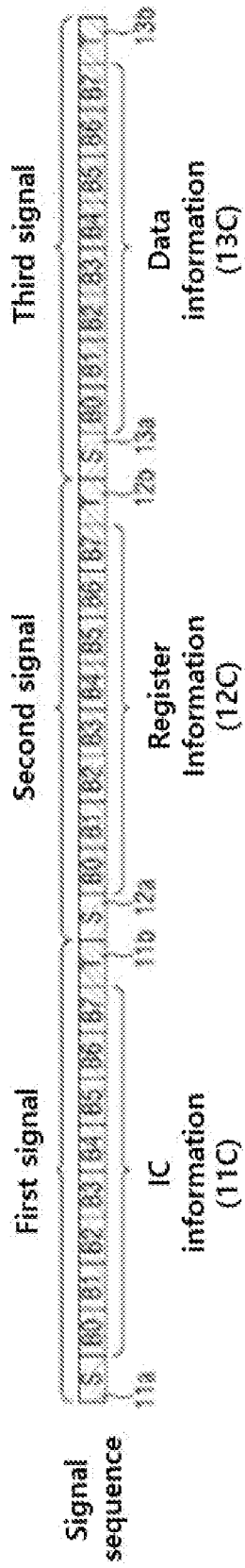
FIG. 2 is a view showing an exemplary structure of a data signal transmitted through the single line interface of FIG. 1.

FIG. 2 is a view showing an exemplary structure of a data signal transmitted through the single line interface of FIG. 1. Referring to FIG. 2, a data signal 10 has a structure of a signal sequence including a series of signals 11, 12, and 13 distinguished from each other.

The signal sequence may include a first signal 11 indicating a target IC among a plurality of ICs 110, 130, 140, and 150 connected to the data line 120, a second signal 12 indicating a target register to which target data is provided among the registers of the target IC, or a third signal 13 indicating target data to be provided to the target IC. However, this is an exemplary structure, and the scope of the present disclosure is not limited thereto.

For example, when it does not need to designate a separate target register, the signal sequence may be configured to include only the first signal 11 and the third signal 13.

The signals 11, 12, and 13 may be distinguished from each other by the start bits 11a, 12a, and 13a and the stop bits 11b, 12b, and 13b. The start bits 11a, 12a, and 13a are bits indicating that a signal begins, and may be, for example, '0'. The stop bits 11b, 12b, and 13b are bits indicating that the signal ends, and may be, for example, '1'.

However, this is an example, and the scope of the present disclosure is not limited thereto. For example, when the idle state of the data line 120 is '0', the start bits 11a, 12a, and 13a may be '1' to be distinguished from the idle state, and the stop bit 11b, 12b, and 13b may be '0' to return to the idle state.

Hereinafter, a case in which the idle state is '1' is assumed for convenience of explanation. In addition, although it is assumed hereinafter that each of the signals 11, 12, and 13 is a 1-byte (8-bit) signal, this is only an assumption for simplifying the description, and the scope of the present disclosure is not limited thereto.

The first signal 11 is a signal that appears first in the signal sequence, and is configured of a start bit 11a, a stop bit 11b, and a data area located therebetween. The first signal 11 is a signal indicating information on a target IC, and the data area includes IC information 11c indicating the target IC.

As an embodiment, the IC information 11c may be address information of the target IC.

The third signal 13 is a signal that follows the first signal 11, and is configured of a start bit 13a, a stop bit 13b, and a data area located therebetween, like the first signal 11.

The third signal 13 is a signal indicating target data to be transmitted to the target IC, and the data area includes actual data information 13c to be provided to the target IC.

The second signal 12 is a signal transmitted between the first signal 11 and the third signal 13, and is configured of a start bit 12a, a stop bit 12b, and a data area located therebetween, like the first signal 11 and the third signal 13. The second signal 12 is a signal indicating information on a specific register of the target IC, and the data area includes register information 12c indicating a specific register of the target IC.

As an embodiment, the register information 12c may be address information of the specific register.

The first signal 11, the second signal 12, and the third signal 13 organically interact with each other to transfer a specific instruction to the target IC. For example, when a data signal including the first signal 11, the second signal 12, and the third signal 13 is transferred to the target IC, the target IC first determines whether the IC itself corresponds to the target IC through the first signal 11.

This may be performed by determining whether information (e.g., an address) on the target IC included in the IC information 11c corresponds to its own information.

When the IC itself is not the target IC, it ignores subsequent signals 12 and 13 and continuously monitors the data line 120.

Contrarily, when the IC itself is the target IC, it receives the second signal 12 that follows, and reads register information 12c therefrom. As an embodiment, the register information 12c that the IC has read may be temporarily stored in a storage space in the target IC for future reference.

Next, the target IC receives the third signal 13 and reads data information 13c from the data area of the third signal 13. Then, the target IC performs a specific operation related to the data information 13c on a specific register corresponding to the register information 12c with reference to the previously read register information 12c.

As an embodiment, the specific operation may be an operation of recording the data information 13c in the specific register.

According to the embodiment described above, it is possible to present a specific structure of a data signal that transfers a command or data to a target IC through a plurality of signals 11, 12, 13 distinguished from each other by the start bits 11a, 12a, 13a and the stop bits 11b, 12b, 13b.

Figure 3:
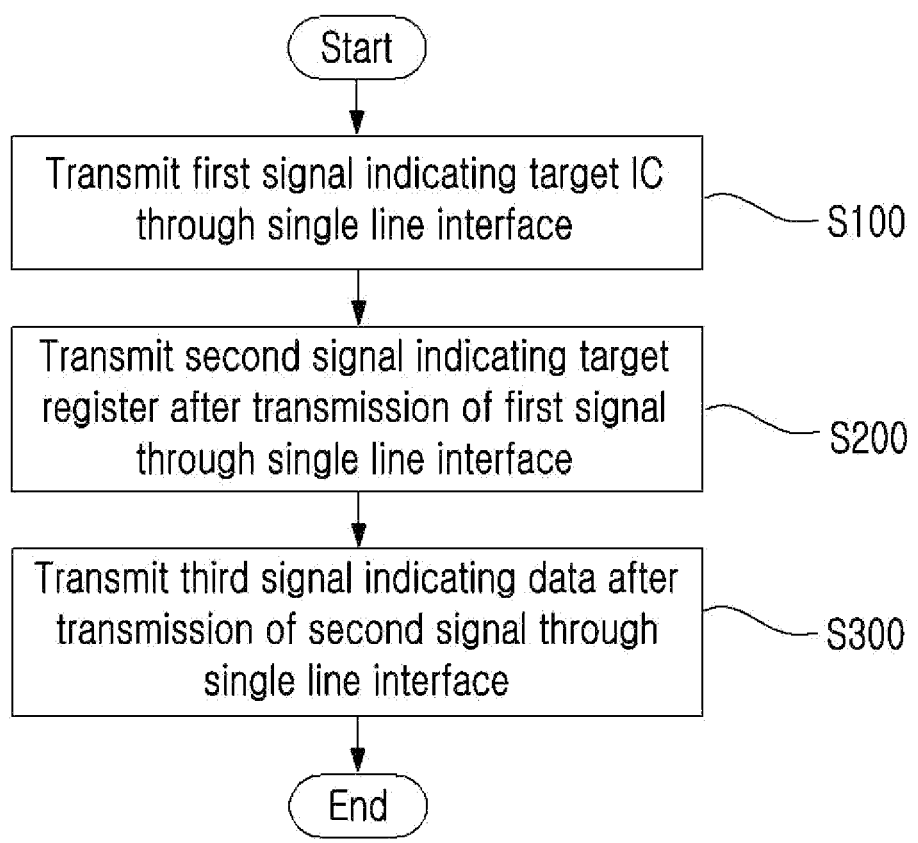
FIG. 3 is a flowchart illustrating a method of performing data communication through a single line interface between a plurality of ICs shown in FIG. 1.

FIG. 3 is a flowchart illustrating a method of performing data communication through a single line interface between a plurality of ICs shown in FIG. 1.

Referring to FIG. 3, the method of performing data communication according to the present embodiment includes three steps S100 to S300.

At step S100, any one among the plurality of ICs 110, 130, 140, and 150 transmits the first signal 11 indicating a target IC through a single line interface.

At this point, the other ICs simultaneously receive the first signal 11 as shown in FIG. 1. As described above, the ICs receiving the first signal 11 may determine whether they correspond to a target IC through the IC information 11c of the first signal.

At step S200, the IC that has transmitted the first signal 11 transmits the second signal 12 indicating a target register through the single line interface after transmission of the first signal 11 is completed. As an embodiment, at this point, an IC that has determined that the IC itself is not a target IC at step S100 may not read and skip the second signal 12 transmitted at step S200.

At step S300, the IC that has transmitted the first signal 11 and the second signal 12 transmits the third signal 13 indicating actual data through the single line interface after transmission of the second signal 12 is completed. At this point, the data may be a data instructing to perform a specific operation on the target register or a data to be recorded in the target register.

As an embodiment, the IC that has determined that the IC itself is not a target IC at step S100 may not read and skip the transmitted third signal 13 in a way similar to that of step S200.

According to the present embodiment of the above steps, there is provided a method of transmitting a data signal by an IC to a plurality of other ICs through a single line interface.

In the method of the present embodiment, although the transmitted data signal is simultaneously provided to all ICs, only an IC corresponding to the target IC among them performs an operation and data processing according to the data signal.

Figure 4:
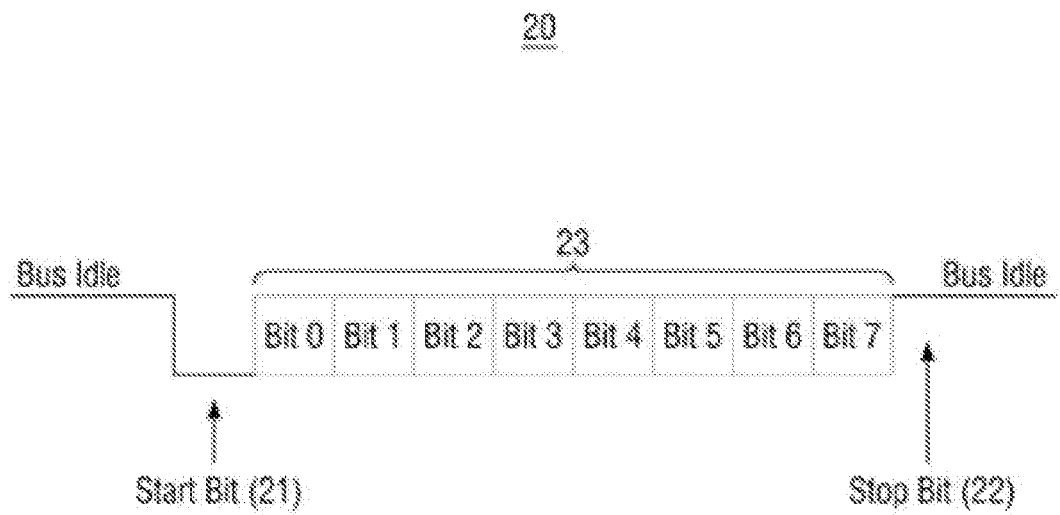
FIG. 4 is a schematic view showing a data frame of a data signal transmitted through the single line interface of FIG. 1.

FIG. 4 is a schematic view showing a data frame of a data signal 20 transmitted through the single line interface of FIG. 1. As shown in FIG. 4, a data frame includes a start bit 21, a stop bit 22, and a data area 23.

The start bit 21 is an area of 1-bit size indicating that the data signal begins, and in the present embodiment, it is exemplified as having a value of '0' that is different from the idle state (here, the pull-up state of '1').

ICs receiving the data signal first detect the start bit 21 and prepare to read the data area 23 that follows. The data area 23 is an area having a size of 8 bits, including actual information to be provided to the ICs receiving the data signal.

The data area 23 may include target IC information, target address information, or actual data information according to the type of the data signal.

The stop bit 22 is an area of 1-bit size indicating that the data signal ends, and in the present embodiment, it is exemplified as having a value of '1' the same as the idle state (here, the pull-up state of '1').

ICs receiving the data signal detect the stop bit 22 and determine that transmission of the data signal is completed. As an embodiment, the ICs receiving the data signal may determine that the stop bit 12 is detected when all three consecutive bits are '1' (i.e., one stop bit and two idle bits are detected).

Figure 5:
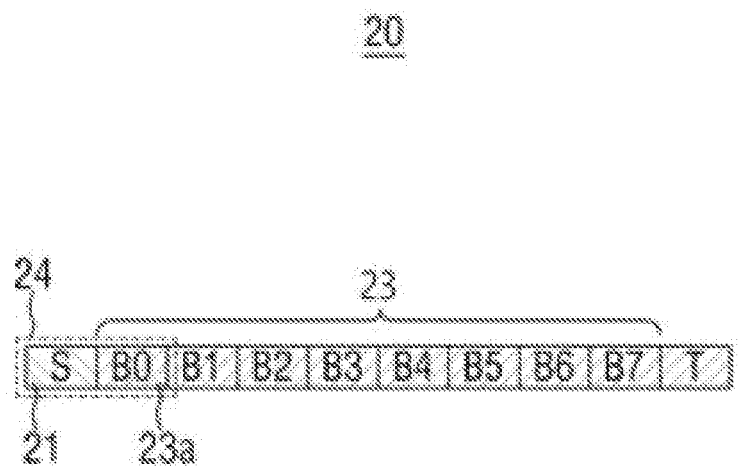
FIGS. 5 and 6 are view conceptually illustrating a method of expressing transmission speed of a data signal in data communication through a single line interface according to some embodiments.
Figure 6:
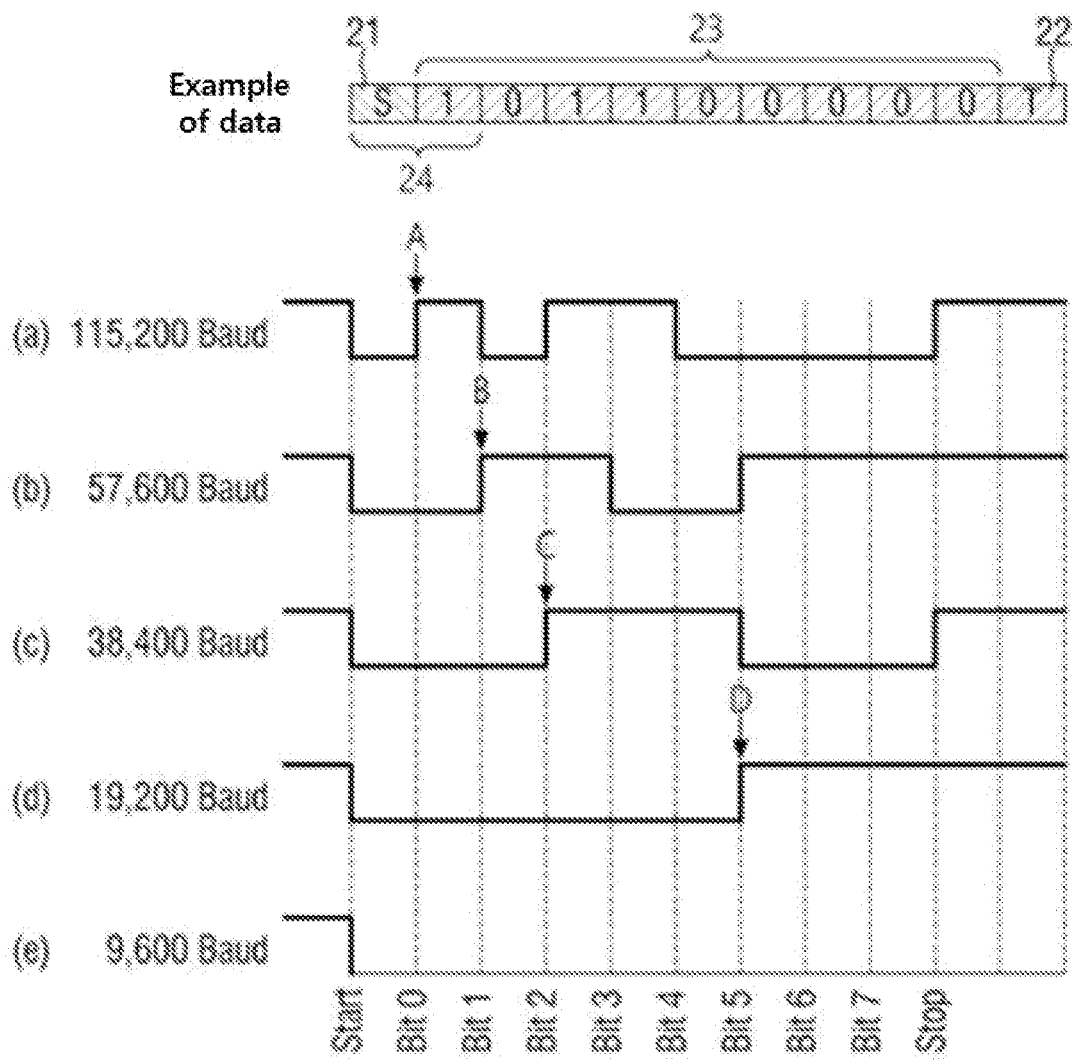

FIGS. 5 and 6 are view conceptually illustrating a method of expressing transmission speed of a data signal in data communication through a single line interface according to some embodiments.

In the present embodiments, the system control device 100 may variably adjust speed of communication (i.e., transmission speed of data signal) when performing data communication through a single line interface.

At this point, the system control device 100 includes information on the speed in the transmitted data signal so that the ICs receiving the data signal may know the transmission speed of the data signal without a separate data line for transferring the speed information.

In the present embodiment, a transmission speed area 24 indicating the transmission speed of the data signal 20 includes a start bit 21 and a bit 23a adjacent thereto.

The adjacent bit 23a may be the first bit of the data area 23. The start bit 21 and the adjacent bit 23a are configured to have complementary values. That is, when the start bit 21 is '1', the adjacent bit 23a is '0', and when the start bit 21 is '0', the adjacent bit 23a is '1'. Since the start bit 21 is exemplified as '0' in the present disclosure, hereinafter, it is assumed that the adjacent bit 23a is '1'.

In the present embodiment, the transmission speed of the data signal 20 is expressed by the pulse width time of the start bit 21 and the adjacent bit 23a.

For more detailed description thereof, refer to FIG. 6.

Referring to FIG. 6, a data signal in which an 8-bit data area 23 of '1 0 1 1 0 0 0 0' and the stop bit 22 are transmitted after the start bit 21 is exemplified.

At this point, an IC receiving the data signal may determine the transmission speed of the data signal by detecting the pulse width time between the start bit 21 and the adjacent bit.

Specifically, referring to FIG. 6(*a*), a signal waveform in the case of transmitting the data signal at a baud rate of 115,200 is shown.

In this case, the IC receiving the data signal calculates the transmission speed of the data signal by calculating the time from the time point when the start bit 21 is initially received to the time point A when the next '1' bit (i.e., adjacent bit) is detected.

In the example shown in (a), since the pulse width between the start bit 21 and the adjacent bit is equal to one bit width, it can be seen that the transmission speed of the data signal is a baud rate of 115,200. (Note that the pulse width corresponding to the baud rate of 115,200 is assumed as a reference pulse width for convenience of comparison between graphs)

On the other hand, referring to FIG. 6(*b*), a signal waveform in the case of transmitting the data signal at a baud rate of 57,600 is shown.

In this case, since the transmission speed is lowered by half, the waveform is also shown in a form horizontally doubled compared to (a).

In this case, since the pulse width from the time point when the first start bit 21 is received to the time point when the next '1' bit is detected (B) is equal to the pulse width of 2 bits, the IC receiving the data signal through this may know that the data signal is transmitted at a baud rate of 57,600.

In the same way, referring to (c), (d) and (e) of FIG. 6, signal waveforms in the case of transmitting the data signal at baud rates of 38,400, 19,200, and 9,600 are shown, respectively.

Since the transmission speed is lowered in the same way as shown in (a) and (b) of FIG. 6, the waveform is further extended horizontally in proportion to the degree of the lowered speed. As shown in the above example, an IC receiving the data signal calculates the pulse width from the time point when the start bit 21 is initially received to the time point (C, D) when the next '1' bit is detected, and then calculates a transmission speed therefrom.

According to the above configuration, since the IC receiving the data signal may read the transmission speed of the data signal using the pulse width time of the area 24 in the data signal, although the transmitting IC changes the transmission speed, the IC receiving the data signal may read data without an error by changing the sampling time point appropriately.

In addition, since the area 24 indicating the transmission speed is included in the data signal, there is an advantage in that a separate data line for transferring transmission speed information is not required.

Figure 7:
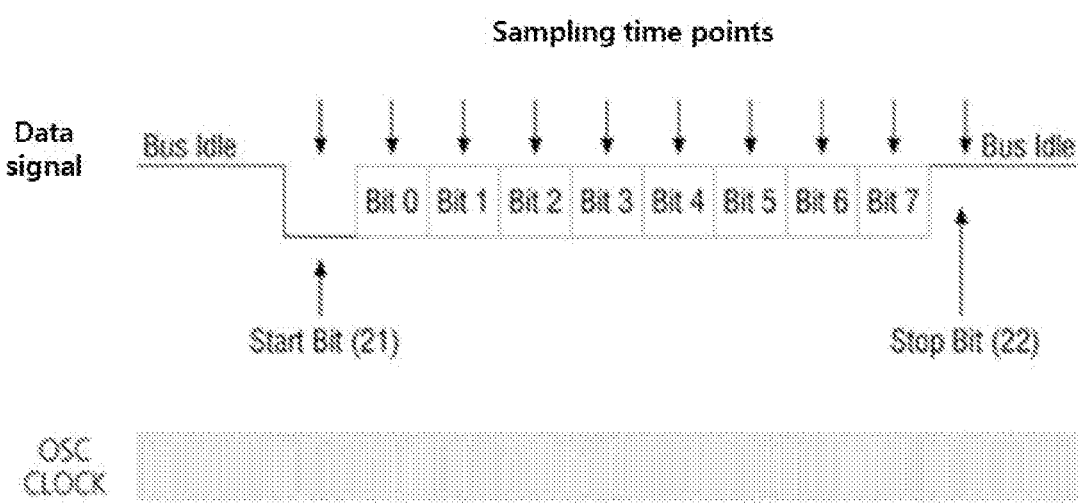
FIG. 7 is a view showing a method of sampling each bit in data communication through a single line interface according to some embodiments of the present disclosure.

FIG. 7 is a view showing a method of sampling each bit in data communication through a single line interface according to some embodiments of the present disclosure.

In the present embodiment, in order to prevent a read error caused by a minute error at a sampling time point, sampling is performed at the center of each pulse, rather than near the edges, when each bit is sampled.

For example, when each bit is sampled near an edge, the sampling time point may be slightly skewed due to a minute error of an IC or an oscillator.

For example, it is assumed that the first bit (Bit 0) after the start bit 21 is sampled.

At this point, when it is designed to perform sampling near the edge, and the sampling is performed a little faster due to a minute error, a read error of sampling the value of the start bit 21 instead of sampling the value of the first bit may occur.

Contrarily, when it is designed to perform sampling at the center of each pulse as shown in the present embodiment, still the first bit value is sampled even although the sampling is performed a little faster or slower due to a minute error, so that the read error as described above can be avoided.

FIGS. 8 to 11 are views showing a method of repeatedly including an area indicating transmission speed of a data signal in order to prevent spread of sampling error in data communication through a single line interface according to some embodiments of the present disclosure.

In a short duration of time, the minute error at the time point of sampling may be solved by sampling at the center of each pulse according to the method of the embodiment of FIG. 7.

However, when the duration of the data signal is further extended, minute errors at the sampling time point are accumulated, and eventually, a state in which magnitude of the error exceeds a half of the pulse width may occur.

In this case, although it is designed to set the sampling time point at the center of the pulse width, an error of reading the value of the adjacent bit, rather than the target bit, may occur as the error is too large. That is, when the length of the data signal is very long, there may be a problem in that the read error cannot be overcome only by the method proposed in FIG. 7.

The present embodiment proposes a method that does not generate a read error, although some errors may occur physically, by managing to minimize the sampling error even when the length of the data signal is very long as described above.

Hereinafter, the detailed description will be continued with reference to FIGS. 8 to 11.

Referring to FIG. 8, a data signal 30 configured of a signal sequence including three signals 31, 32, and 33 is shown. At this point, the signals 31, 32, and 33 are distinguished from each other by the start bit and the stop bit included in each of the signals, in a way similar to that of the previous embodiments.

However, in the embodiment of FIG. 8, it is characterized in that the signals 31, 32, and 33 respectively include areas 31*a*, 32*a*, and 33*a* indicating the transmission speed of the data signal.

The way of showing the transmission speed by the areas 31*a*, 32*a*, and 33*a* indicating the transmission speed is the same as that of the embodiment shown in FIGS. 5 and 6.

That is, the transmission speed of the data signal is calculated by configuring the start bit and the adjacent bit to have different values, and calculating the pulse width time between the start bit and the adjacent bit.

However, in the present embodiment, as the second signal 32 and the third signal 33, as well as the first signal 31, include the areas 31*a*, 32*a*, and 33*a* indicating the transmission speed, an IC receiving the data signal may repeatedly receive the transmission speed of the data signal and repeatedly refresh the sampling time point according thereto.

That is, when only the first signal 31 of the data signal includes transmission speed information, an IC receiving data determines a sampling time point according to the read transmission speed information, and samples each pulse on the basis of the determined sampling time point.

In this case, although an error occurs at a subsequent sampling time point, there is no way to correct the error, and therefore, when the data signal is extended longer, minute sampling time point errors are accumulated, and a problem of generating a read error occurs eventually.

Contrarily, according to the embodiment of FIG. 8, when the second signal 32 is received, an IC receiving the data signal determines again the sampling time point according to the area 32a indicating the transmission speed, and therefore, there is an effect of resetting the sampling errors generated in the process of reading the first signal 31.

Similarly, even when the third signal 33 is received, an IC receiving the data signal determines again the sampling time point according to the area 33a indicating the transmission speed, and therefore, there is an effect of resetting the sampling errors generated in the process of reading the second signal 32.

That is, according to the present embodiment, as the sampling time point may be periodically refreshed by having the data signal 30 repeatedly include the areas 31a, 32a, and 33a indicating the transmission speed, there is an effect of resetting previously accumulated sampling errors.

Accordingly, although the length of the data signal 30 increases, the sampling error is not accumulated to be larger than a predetermined level, and although some errors may occur physically, a read error does not occur as a result.

FIG. 9 is a view showing an embodiment in which the embodiment of FIG. 8 is combined with the embodiment of FIG. 2. Referring to FIG. 9, the data signal 40 includes a first signal 41 indicating IC information, a second signal 42 indicating register information, and a third signal 43 indicating data information, like the embodiment of FIG. 2.

In addition, in a way the same as that of the embodiment of FIG. 8, the value of a bit adjacent to the start bit is set to '1' in each of the signals 41, 42, and 43.

Accordingly, an IC receiving the data signal 40 may read the transmission speed of the data signal 40 by the first two bits (i.e., the start bit and its adjacent bit) of each of the signals 41, 42, 43, and refresh the sampling time point each time.

At this point, since each of the signals 41, 42, and 43 should allocate the adjacent bit of the start bit as an area for transmission speed, the area 41b indicating IC information of the first signal 41, the area 42b indicating register information of the second signal, and the area 43b indicating data information of the third signal are configured as a 7-bit area, respectively.

As an embodiment, the first bit 42c of the area 42b indicating register information of the second signal may be allocated to information indicating a specific operation.

For example, when the first bit 42c is '0', this may mean a write command instructing to record data information at a register address that follows.

Meanwhile, when transfer of the data signal 40 is completed, it needs to release the data communication between the plurality of ICs allocated for this purpose so as to be prepared in a state in which the next data signal can be transferred.

In the present embodiment, the release may be performed in response to detection of the stop bit of the third signal 43 and two idle bits adjacent thereto.

For example, when data communication is released immediately after the stop bit is detected, the interval with the next data signal is too small, and confusion may occur in transmitting and receiving signals.

Accordingly, in the present embodiment, in order to prevent the confusion, data communication is not released immediately although the stop bit of the third signal 43 is detected, but the data communication is released after waiting for detection of two more idle bits.

As an embodiment, the stop bit and the two idle bits for the release may be configured to show the same value (e.g., '1').

FIG. 10 is a view showing a modified embodiment of the embodiment of FIG. 9.

Referring to FIG. 10, only the first signal 51 and the second signal 52 of the data signal 50 include areas 51a and 52a indicating the transmission speed, and the third signal 53 does not include an area indicating the transmission speed.

The present embodiment may be useful when it is desired to secure a larger area 53b that indicates data information. That is, since the required data size of the IC information and the register information is not large, the areas 51a and 52a indicating the transmission speed are included in the first signal 51 and the second signal 52 including the same, and since the data size required for actual data information is large, a larger area for storing data can be secured in the third signal 53 including the actual data information by removing the area indicating the transmission speed.

According to the above embodiment, as the areas 51a and 52a indicating the transmission speed are repeatedly included in the data signal 50, there is an advantage in that the area 53b for storing actual data is secured to the maximum while the sampling time point is periodically refreshed.

FIG. 11 is a view showing an embodiment in which two or more signals indicating data information are consecutively transmitted in the embodiment of FIG. 10. Referring to FIG. 11, the data signal 60 further includes a fourth signal 64 indicating other data information after the third signal 63 indicating data information.

The embodiment of FIG. 11 is similar to the embodiment of FIG. 10 overall.

However, since there is the fourth signal 64 coming after the third signal 63, a release signal configured of one stop bit and two idle bits is detected after the fourth signal 64, and the IC receiving the data signal 60 stops receiving data signals after receiving up to the fourth signal 64.

Figure 12:
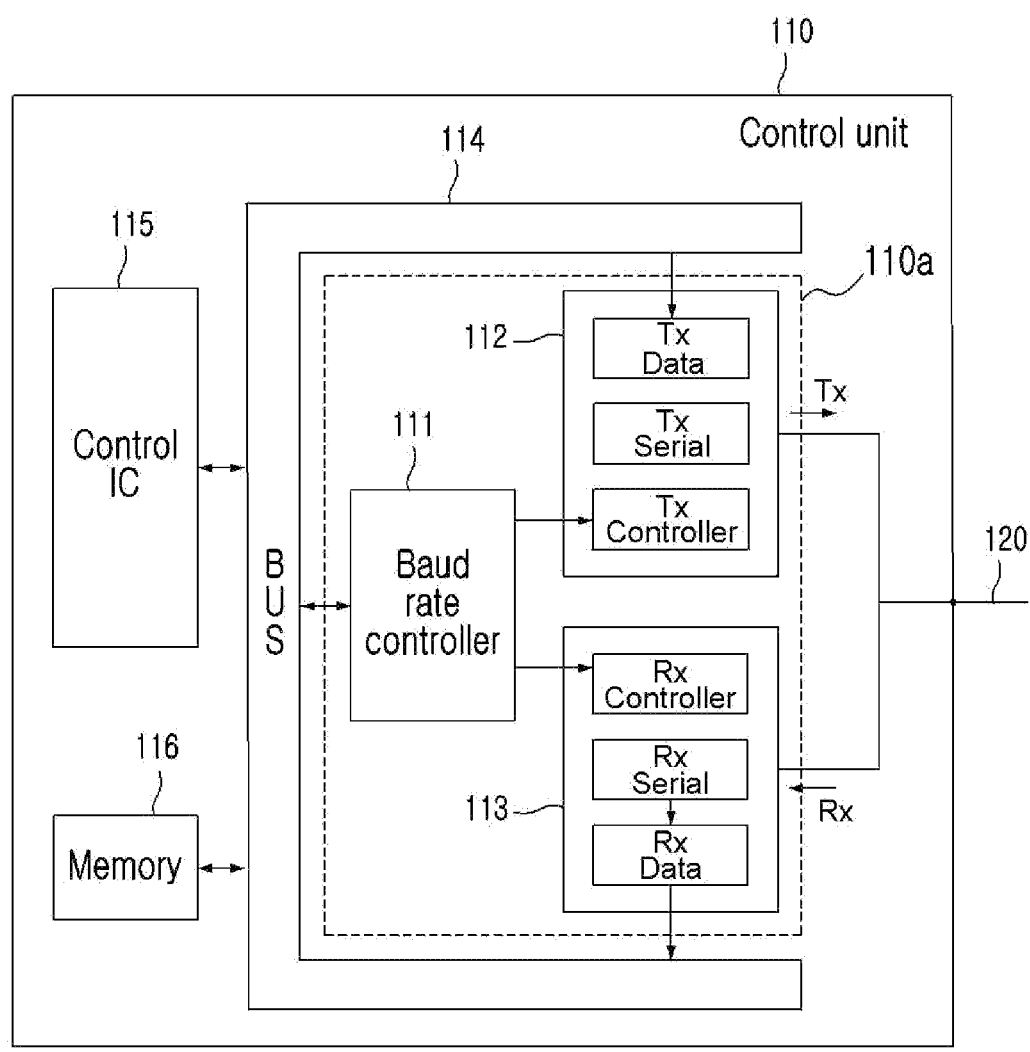
FIG. 12 is a block diagram showing an exemplary configuration of the control IC 110 shown in FIG. 1.

FIG. 12 is a block diagram showing an exemplary configuration of the control IC 110 shown in FIG. 1.

Referring to FIG. 12, the control IC 110 includes a single line interface 110a, a data bus 114, a control unit 115, and a memory 116.

The single line interface 110a is an input/output interface for performing the data communication described with reference to FIGS. 1 to 11. The single line interface 110a is configured to transmit and receive data to and from a plurality of other ICs through the single data line 120.

As an embodiment, the single line interface 110a may include a baud rate controller 111, an output module 112, and an input module 113.

The baud rate controller 111 provides a control signal related to the baud rate to the output module 112 so that output data may be transmitted at the set baud rate.

In addition, the baud rate controller 111 provides baud rate information to the input module 112 so that input data may be sampled according to the set baud rate.

The output module 112 is a module that outputs the data signals 10, 20, 30, 40, 50, and 60 described above to the data line 120, and it receives transmission data from the data bus 114 to form a transmission serial, and outputs the transmission serial to the data line under the control of a transmission controller.

The input module 113 is a module that receives the data signals 10, 20, 30, 40, 50, and 60 described above from the data line 120, and it receives an input serial under the control of an input controller, processes the input serial into input data, and transfers the input data to the data bus 114.

The data bus 114 provides a communication function between the components of the control IC 110. The bus 114 may be implemented as various forms of buses, such as an address bus, a data bus, a control bus, and the like.

The control unit 115 performs a controller function for controlling the overall function of the control IC 110 and the operation of each component. The control unit 115 may be implemented as one independent piece of hardware, or may be implemented as a combination of a plurality of software modules.

Since specific forms and functions of the control unit 115, which can be implemented, are widely known in the art, detailed description thereof will be omitted here.

The memory 116 may temporarily or non-temporarily store one or more data or programs. The memory 116 may be configured to include a non-volatile memory, such as read only memory (ROM), erasable programmable ROM (EPROM), electrically erasable programmable ROM (EEPROM), flash memory, or the like, a hard disk, a removable disk, or any type of computer-readable recording medium well known in the art.

Figure 13:
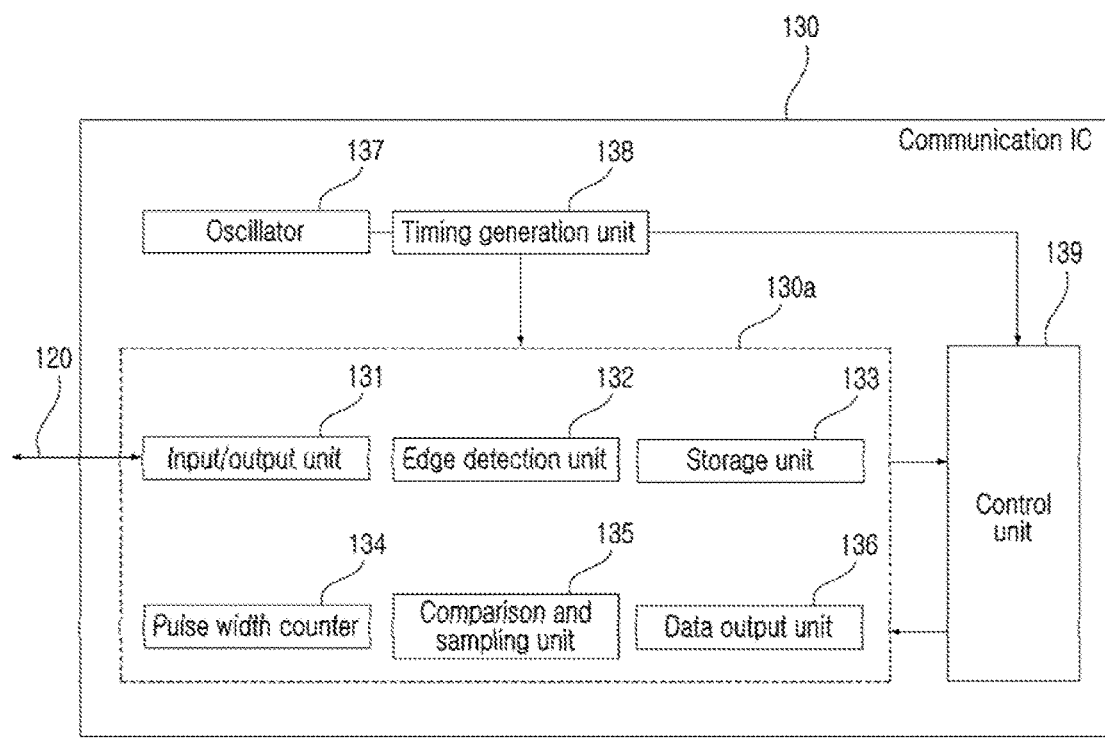
FIG. 13 is a block diagram showing an exemplary configuration of the communication IC 130 shown in FIG. 1.

FIG. 13 is a block diagram showing an exemplary configuration of the communication IC 130 shown in FIG. 1. Referring to FIG. 13, the communication IC 130 includes a single line interface 130a, an oscillator 137, a timing generation unit 138, and a control unit 139.

The single line interface 130a is an input/output interface for performing the data communication described with reference to FIGS. 1 to 11. The single line interface 130a is configured to transmit and receive data to and from a plurality of other ICs through the single data line 120.

As an embodiment, the single line interface 130a may include an input/output unit 131, an edge detection unit 132, a storage unit 133, a pulse width counter 134, a comparison and sampling unit 135, and a data output unit 136.

The input/output unit 131 performs a function of outputting data signals 10, 20, 30, 40, 50, and 60 to the data line 120 or receiving data signals 10, 20, 30, 40, 50, and 60 from the data line 120.

The edge detection unit 132 performs a function of detecting edges of each of the pulses of the data signals 10, 20, 30, 40, 50 and 60 transferred through the data line 120. To this end, it may receive timing information from the timing generation unit 138.

At this point, the timing generation unit 138 may generate the timing information with reference to clock information provided by the oscillator 137.

The storage unit 133 provides a storage means for the single line interface 130a. The storage unit 133 may temporarily or non-temporarily store one or more data or programs.

The memory 116 may be configured to include a non-volatile memory, such as read only memory (ROM), erasable programmable ROM (EPROM), electrically erasable programmable ROM (EEPROM), flash memory, or the like, a hard disk, a removable disk, or any type of computer-readable recording medium well known in the art.

The pulse width counter 134 performs a function of calculating each pulse width of the data signals 10, 20, 30, 40, 50, and 60.

As described above in the forementioned embodiments, various functions such as calculating the transmission speed of the data signals 10, 20, 30, 40, 50, and 60 based on the calculated pulse width may be performed. The comparison and sampling unit 135 performs a function of sampling a bit value of each pulse so that the single line interface 130a may read each pulse value of the data signals 10, 20, 30, 40, 50, and 60.

The data output unit 136 performs a function of collecting, processing, and editing data that will be output to the data line 120 through the input/output unit 131.

The control unit 139 performs a controller function for controlling the overall function of the communication IC 130 and the operation of each component. The control unit 139 may be implemented as one independent piece of hardware, or may be implemented as a combination of a plurality of software modules.

Since specific forms and functions of the control unit 139, which can be implemented, are widely known in the art, detailed description thereof will be omitted here.

Various embodiments of the present disclosure and effects according to the embodiments have been described above with reference to FIGS. 1 to 13. The effects according to the technical spirit of the present disclosure are not limited to the effects mentioned above, and unmentioned other effects will be clearly understood by those skilled in the art from the following description.

In addition, the technical spirit of the present disclosure described above may be implemented as a computer-readable code on a computer-readable medium. The computer-readable recording medium may be, for example, a portable recording medium (CD, DVD, Blu-ray disk, USB storage device, portable hard disk) or a fixed recording medium (ROM, RAM, computer-equipped hard disk).

The computer program recorded in the computer-readable recording medium may be transmitted to another computing device through a network such as the Internet or the like and installed in another computing device, and therefore may be used in another computing device.

Although all the components configuring the embodiments of the present disclosure are described as being combined in one piece or operating in combination, the technical spirit of the present disclosure is not necessarily limited to the embodiments. That is, within the scope of the objects of the present disclosure, all the components may operate by selectively combining one or more.

Although the operations are shown in a particular order in the drawings, it should not be understood that the operations should be performed in a specific order or a sequential order as shown in the drawings or all the operations shown in the drawings should be performed to obtain a desired result.

In a specific situation, multitasking and parallel processing may be advantageous. Moreover, separation of the various components in the embodiments described above should not be construed as being necessarily required, and it should be understood that the described program components and systems may be generally integrated together into a single software product or packaged into a plurality of software products.

Although the embodiments of the present disclosure have been described with reference to the accompanying drawings, those skilled in the art may understand that the present disclosure may be embodied in other specific forms without changing the technical spirit or essential features. Therefore, it should be understood that the embodiments described above are illustrative in all respects and not restrictive.

The protection scope of the present disclosure should be interpreted by the following claims, and all technical spirits within the equivalent range should be interpreted as being included in the scope of the technical spirits defined by the present disclosure.

DESCRIPTION OF SYMBOLS

110: Control IC
120: Data line
130, 140, 150: Communication IC
10, 20, 30, 40, 50, 60: Data signal
110a, 130a: Single line interface
111: Baud rate controller
112: Output module
113: Input module
114: Bus
115: Control unit
116: Memory
131: Input/output unit
132: Edge detection unit
133: Storage unit
134: Pulse width counter
135: Comparison and sampling unit
136: Data output unit
137: Oscillator
138: Timing generation unit
139: Control unit

The invention claimed is:

1. A system control device comprising:
a plurality of ICs comprising an interface and an oscillator,
wherein the interface is configured to transmit and receive data signals between the plurality of ICs and the oscillator is configured to provide a clock information to the interface; and
a single data line for transferring the data signals between the plurality of ICs through the single data line,
wherein the data signals include:
a first signal indicating a target IC among the plurality of ICs;
a third signal indicating a target data to be provided to the target IC; and
a second signal positioning between the first and third signals and indicating a target register, to which the target data is provided, among registers of the target IC,
wherein the first signal includes:
a first start bit having a first logic level that is different from an idle state logic level of the single data line;
a first adjacent bit following to the start bit and having a second logic level that is complementary to the first logic level;
a first information area following the adjacent bit and having address information of the target IC; and
a first stop bit having the idle state logic level,
wherein a transmission speed of the data signals is defined by a pulse width time between the start bit and the adjacent bit,
wherein the second signal includes:
a second start bit;
a second adjacent bit;
a second information area containing register information; and
a second stop bit,
wherein the third signal includes:
a third start bit,
a third information area containing data information, and
a third stop bit,
wherein each of the first signal and the second signal includes an area indicating the transmission speed of the data signals for enabling periodic refresh of a sampling time point,
wherein in response to sampling the data signals, the plurality of ICs are configured to determine the sampling time point to perform sampling at a center of each pulse to prevent a read error, and
wherein the data communication for transfer of the data signals is released in response to detection of the third stop bit of the third signal and two consecutive idle bits adjacent to the third stop bit having the same logic level as the idle state logic level.

2. The device according to claim 1, wherein an IC corresponding to the address information among the plurality of ICs processes the target data in response to the third signal, and an IC that does not correspond to the address information among the plurality of ICs does not process the target data despite the third signal.

3. A system control device comprising:
a plurality of ICs comprising an interface and an oscillator,
wherein the interface is configured to transmit and receive a plurality of data signals between the plurality of ICs and the oscillator is configured to provide a clock information to the interface; and
a signal data line for transferring the plurality of data signals between the plurality of ICs through the single data line, wherein
the plurality of data signals are distinguished from each other, wherein the plurality of data signals include:
a first signal indicating a target IC among the plurality of ICs;
a third signal indicating a target data to be provided to the target IC; and
a second signal positioning between the first and third signals and indicating a target register, to which the target data is provided, among registers of the target IC,
wherein the first signal includes:
a first start bit having a first logic level that is different from an idle state logic level of the single data line;
a first adjacent bit following to the start bit and having a second logic level that is complementary to the first logic level;
a first information area following the adjacent bit and having address information of the target IC; and
a first stop bit having the idle state logic level,
wherein the second signal includes:
a second start bit;
a second adjacent bit;
a second information area containing register information; and
a second stop bit,
wherein the third signal includes:
a third start bit,
a third information area containing data information, and
a third stop bit without an adjacent bit for indicating the transmission speed, thereby securing a larger area for the data information,
wherein the plurality of data signals includes an area indicating a transmission speed of the data signal for enabling periodic refresh of a sample time point, and the transmission speed of the data signal is indicated by a pulse width time between the start bit of a signal, including the area indicating the transmission speed of the data signal among the plurality of data signals, wherein in response to sampling the data signals, the plurality of ICs are configured to determine the sampling time point to perform sampling at a center of each pulse to prevent a read error, and wherein the data communication for transfer of the data signals is released in response to detection of the third stop bit of the third signal and two consecutive idle bits adjacent to the third stop bit having the same logic level as the idle state logic level.

4. The device according to claim 3, wherein the plurality of data signals repeatedly includes an area indicating the transmission speed of the data signal.

5. An integrated circuit comprising:

a control unit;

an interface unit for receiving data from the control unit or providing data to the control unit; and a timing generation unit configured to provide a clock information to the interface unit and the control unit, wherein the interface unit is configured to simultaneously transfer the data signal to the plurality of ICs through a single data line, and the data signal includes:

a first signal indicating a target IC among the plurality of ICs;

a third signal indicating a target data to be provided to the target IC; and a second signal positioning between the first and third signals and indicating a target register, to which the target data is provided, among registers of the target IC, wherein the first signal includes:

a first start bit having a first logic level that is different from an idle state logic level of the single data line;

a first adjacent bit following to the start bit and having a second logic level that is complementary to the first logic level;

a first information area following the adjacent bit and having address information of the target IC; and a first stop bit having the idle state logic level, wherein a transmission speed of the data signals is defined by a pulse width time between the start bit and the adjacent bit, wherein the second signal includes:

a second start bit;

a second adjacent bit;

a second information area containing register information; and a second stop bit, wherein the third signal includes:

a third start bit, a third information area containing data information, and a third stop bit, wherein each of the first signal and the second signal includes an area indicating the transmission speed of the data signals for enabling periodic refresh of a sampling time point, wherein in response to sampling the data signals, the plurality of ICs are configured to determine the sampling time point to perform sampling at a center of each pulse to prevent a read error, and wherein the data communication for transfer of the data signals is released in response to detection of the third stop bit of the third signal and two consecutive idle bits adjacent to the third stop bit having the same logic level as the idle state logic level.

6. The integrated circuit according to claim 5, wherein the interface unit receives different data signals from the plurality of ICs through the single data line, and the control unit determines whether or not to perform receiving or processing data included in the different data signals on the basis of address information included in the different data signal.

* * * * *